May 14, 1935.  F. HERRLINGER  2,001,492
METHOD OF ASSEMBLING PACKING RINGS IN TURBINE ROTORS
Filed Nov. 14, 1933
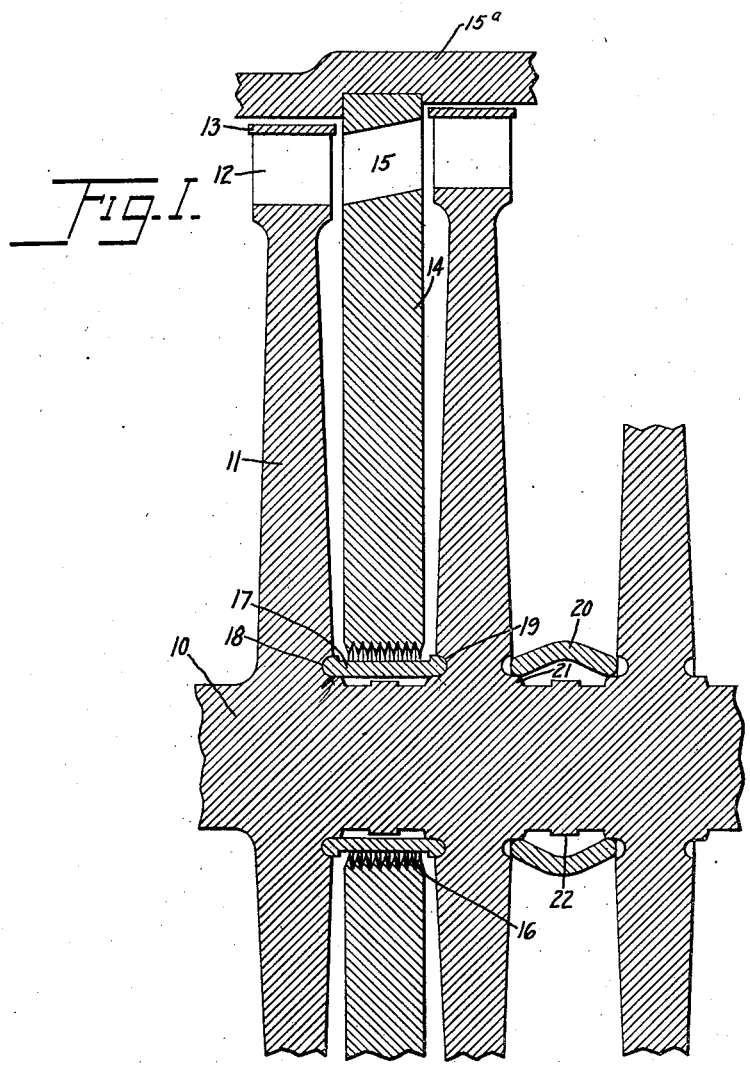
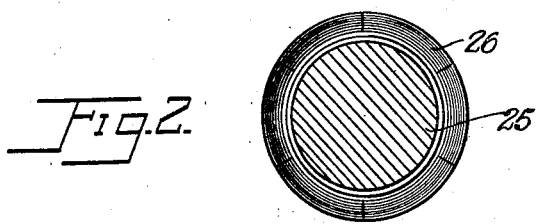
Inventor:
Fritz Herrlinger,
by Harry E. Dunham
His Attorney.

Patented May 14, 1935

2,001,492

UNITED STATES PATENT OFFICE 2,001,492

METHOD OF ASSEMBLING PACKING RINGS IN TURBINE ROTORS

Fritz Herrlinger, Berlin, Germany, assignor to General Electric Company, a corporation of New York Application November 14, 1933, Serial No. 697,934
In Germany May 16, 1933

2 Claims. (Cl. 29—156.8)

The present invention relates to elastic fluid turbines having solid rotors with the wheels integrally formed with the shaft, more specifically to the method of assembling the interstage packings, that is, the packings arranged between such rotors and the diaphragms intermediate adjacent wheels.

One object of my invention is to provide an improved construction and arrangement of such packings whereby leakage of fluid along the shaft from one stage to a lower stage is substantially eliminated.

For a consideration of what I believe to be novel and my invention, attention is directed to the following description and the claims appended thereto in connection with the accompanying drawing.

In the drawing, Fig. 1 illustrates a cross sectional view, partly broken away and partly diagrammatic of an elastic fluid turbine embodying my invention, and Fig. 2 represents a modification of a packing ring shown in Fig. 1.

The turbine comprises a solid rotor having a shaft 10 and a plurality of wheels 11 integrally formed with the rotor 10. Each wheel carries a row of buckets 12 fastened thereto in any suitable manner and united at the outer ends by a ring 13. A diaphragm 14 having partitions or blades 15 is interposed between adjacent bucket wheels for properly directing the flow of fluid from a higher to a lower stage. The diaphragms are split in halves, supported by a casing 15a. An interstage packing is provided between the inner surface of the diaphragm and the shaft portion facing the inner surface to prevent leakage of elastic fluid along the shaft. To this end the surface of the diaphragm facing the shaft is provided with annular grooves 16 defining what may be termed a packing surface. The packing in accordance with my invention comprises a packing ring 17 held in opposite grooves 18 and 19 of adjacent wheels and concentrically spaced between the packing surface and the shaft. The ring 17 is spaced from the shaft to minimize heat transfer from the ring to the shaft in case the outer surface of the ring rubs against the packing surface of the diaphragm. The ring may be a split ring or consist of a plurality of segmental portions which may be solid or laminated with the outer edges of the rings or segments or laminations held in the grooves 18 and 19 respectively. In the modification of Fig. 2 I have shown a shaft 25 corresponding to the shaft 10 of Fig. 1, together with a packing ring 26 concentrically arranged with the shaft. The ring comprises a plurality of laminated segments. The ring according to my invention is made with a V-shaped cross section as indicated at 20 to permit assembly and the inner portions of the wheels adjacent the shaft define shoulders 21 to facilitate assembly of the packing rings. During assembly the ring 20 with V-shaped cross section is inserted and forced towards the shoulders 21 so that it straightens out and the edges of the ring enter the annular grooves 18 and 19 respectively. The left-hand side of the drawing shows a ring completely assembled, whereas the right-hand side of the drawing shows a stage of the assembly. Stops, which may be in the form of a narrow, annular collar 22 between adjacent wheels on the shaft, are provided to facilitate assembly. As will be readily seen, the collar prevents the V-shaped packing ring from bending in opposite direction and thus engaging the shaft. Furthermore, during operation the collar limits deformation of the ring in case the diaphragm rubs on the outer surface of the ring.

With my invention I have accomplished a simple and reliable interstage packing arrangement between the diaphragm and the shaft of a solid turbine rotor.

What I claim as new and desire to secure by Letters Patent in the United States is:

1. In an elastic fluid turbine having a rotor with wheels integrally formed with the shaft and a diaphragm intermediate adjacent wheels, the method of assembling a packing ring intermediate the shaft and a packing surface on the diaphragm which method comprises inserting a plurality of ring segments in V-shaped form in opposite grooves in the adjacent surfaces of the wheels and forcing the V-shaped portions of the segments inwardly whereby the segments assume a cylindrical shape.

2. In an elastic fluid turbine having a rotor with a plurality of bucket wheels on the shaft and a diaphragm intermediate adjacent bucket wheels, the method of assembling a packing ring intermediate the shaft and a packing surface on the diaphragm which method comprises inserting a plurality of ring segments in V-shaped form in opposite grooves in the adjacent surfaces of the wheels and forcing the V-shaped portions of the segments inwardly whereby the segments assume a cylindrical shape.

FRITZ HERRLINGER.